May 10, 1927.
T. MILLER
AUTOMOBILE LOCKING APPARATUS
Filed May 13, 1926
1,628,469
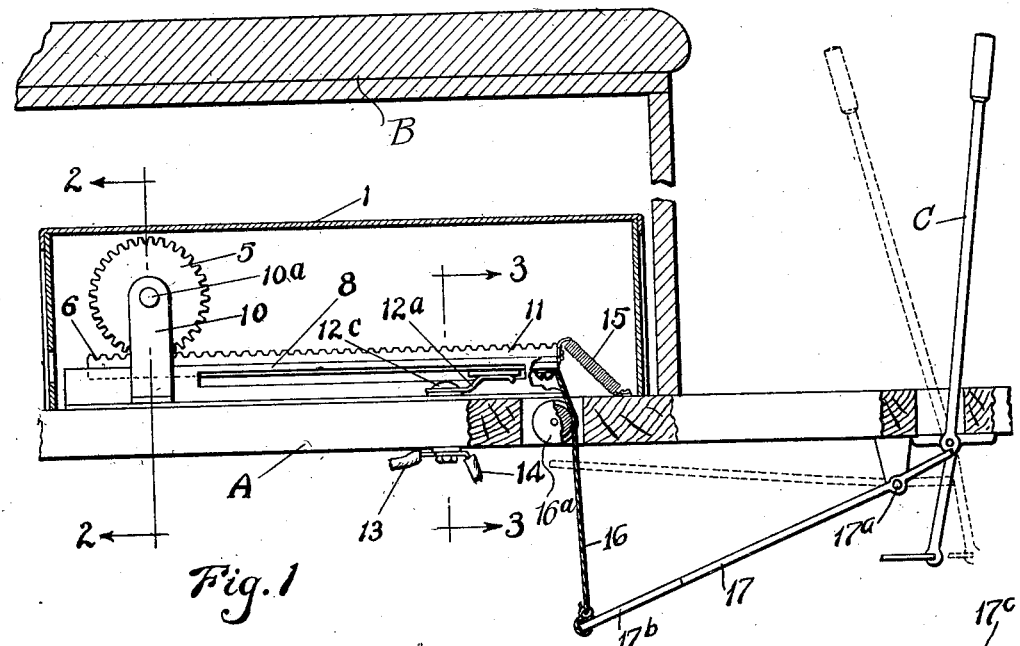
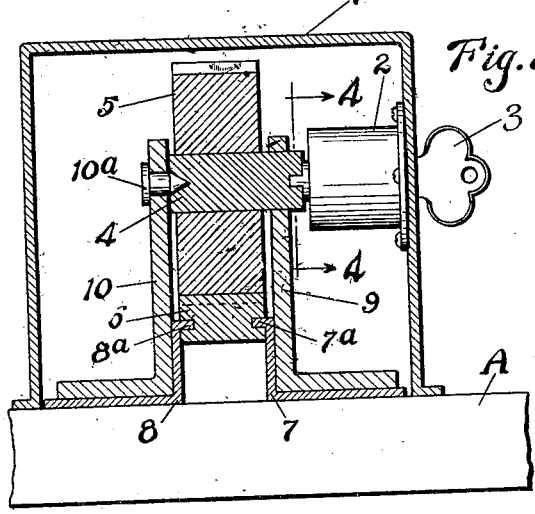
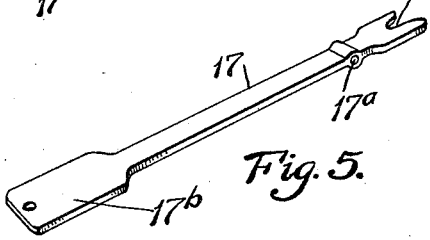
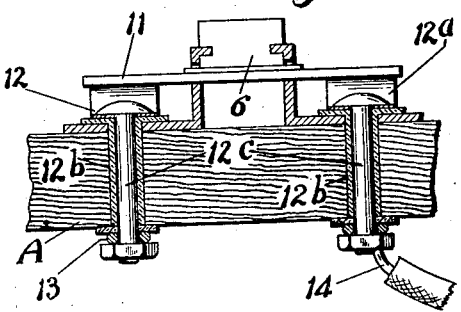
INVENTOR.
TED MILLER
BY
A. B. Bowman
ATTORNEY.

Patented May 10, 1927.

1,628,469

UNITED STATES PATENT OFFICE.

TED MILLER, OF ENCINITAS, CALIFORNIA.

AUTOMOBILE-LOCKING APPARATUS.

Application filed May 13, 1926. Serial No. 108,748.

My invention relates to locking apparatus for automobiles and the objects of my invention are; first, to provide a device for locking an automobile by closing the circuit of the battery so that there is no current to operate the motor; second, to provide a means in connection therewith for locking the brake lever so that it cannot be moved; third, to provide an apparatus of this class in which if the car becomes short circuited while driving, the circuit can be immediately broken; fourth, to provide an apparatus of this class which connects and disconnects the negative post of the battery with the ground, thus cutting out the circuit for operating when the apparatus is in locked position; fifth to provide a novelly constructed automobile lock apparatus; and, sixth, to provide an apparatus of this class which is very simple and economical of construction, durable, efficient in its action, easily applied to automobiles now in use and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal elevational view of my device shown positioned under the front seat of an automobile and ready for use, showing some of the parts in section to facilitate the illustration; Fig. 2 is a transverse sectional view on an enlarged scale through 2—2 of Fig. 1; Fig. 3 is a transverse sectional view on an enlarged scale through 3—3 of Fig. 1; Fig. 4 is a sectional view through 4—4 of Fig. 2, and Fig. 5 is a perspective view of the brake lever locking lever.

Similar characters of reference refer to similar parts and portions throughout the several views of the drawings.

The casing 1, lock member 2, key 3, axle member 4, gear 5, gear rack 6, gear rack supports 7 and 8, shaft supports 9 and 10, contact members 11 and 12 and $12^a$, electrical conductors 13 and 14, spring member 15, cable 16 and brake locking lever 17 constitute the principal parts and portions of my automobile locking apparatus.

The casing 1 is preferably a strong metallic casing, positioned on the floor A of the automobile under the seat B. Secured to the floor A and extending longitudinally in the casing is a pair of spaced apart L-shaped supporting members 7 and 8. They are each provided with inwardly extending portions $7^a$ and $8^a$ which fit into conforming grooves in the side wall of the gear rack 6 so that this gear rack 6 is adapted to reciprocate on these portions $7^a$ and $8^a$ which form a guide and support for the same. Secured on the base portions thereof near the one end is a pair of L-shaped supports 9 and 10 which extend some distance above the rack and in which is mounted the shaft 4 so that the shaft 4 will revolve on the members 9 and 10.

It will be noted that the support 10 is provided with a journal member $10^a$ upon which the one end of the shaft 4 is journaled. The opposite end is journaled in the member 9. Secured on this shaft 4 is a spur gear 5 which meshes with the gear rack 6. This shaft 4 is provided in one end with an elongated recess $4^a$ in which is adapted to fit the one end of a conforming lock member $2^a$, thus providing for turning the shaft 4 with the revolution of the lock member $2^a$. This lock member $2^a$ is supported by a conventional lock of the revoluble type, that is, the type that revolves with the turning of the key and may be any lock of this class. The lock 2 is supported on the side of the casing 1 as shown best in Fig. 2 of the drawings. Connected to the one end of the gear rack 6 is the one end of a tension spring 15, the opposite end of which is secured to the floor A, thus providing a means tending to draw the gear rack to the position shown in Fig. 1 of the drawings. Also secured to this end of this gear rack 4 is a cable 16 which is preferably a wire which is adapted to extend over a pulley $16^a$ revolubly mounted in the floor A. To the opposite end of this cable 16 is attached the one end of a lever 17 which is pivotally mounted at point $17^a$ and the opposite end is provided with a slot $17^c$, thus providing a furcated end which extends over the lower end of the brake lever C of the automobile.

It will be noted that this lever 17 is provided on the one end with a counter balance portion 17$^b$, tending to balance it in the position shown by solid lines in Fig. 1 of the drawings, and in such position this lever rests against the brake lever and thus provides a means for preventing the movement of the gear rack toward the gear. However, when the brake is applied on the automobile, the opposite end of this lever may move downwardly, as shown by dotted lines in Fig. 1 of the drawings. Then, by turning the key 3, the gear rack is moved backwardly drawing the lever 17 upwardly as shown by dotted lines in Fig. 1 of the drawings, where it is positioned to engage the brake and prevent releasing the brake, it being noted that by turning the key 3, the lock 2 will hold the shaft 4 when turned to a certain position and thus hold the gear rack in backward position.

Secured to the lower side of the gear rack 4 and extending below and to each side of the same is an electrical contact member 11, and mounted on the floor and insulated therefrom are other electrical contacts 12 and 12$^a$ which are adapted to engage said contact 11 when the gear rack is in the position shown in Fig. 1 of the drawings, but disengaged when the gear rack is moved backwardly by the operation of the key in the lock. These contacts 12 and 12$^a$ are supported in the floor by means of bolts 12$^c$ around which are insulation members 12$^b$, thus providing for complete insulation of the contacts 12 and 12$^a$ from the floor A. To one of the bolts 12$^c$, which serves as a terminal, is connected an electrical conductor 13 which extends to and is grounded on the automobile body. The other bolt 12$^c$ serves as a terminal for the conductor 14 which extends to the negative post of the automobile starting and lighting battery.

The operation of the automobile locking apparatus is as follows: When it is desired to lock the automobile, the brake C is applied, then the key 3 is turned in the lock to a locked position. This in turn revolves the shaft 4, together with the gear 5, moving the gear rack so that the contact 11 is disengaged from the contacts 12 and 12$^a$, thus breaking the circuit so that there is no current for operating the automobile. This in turn draws the extended end of the lever 17 upwardly so that it engages the lower end of the brake lever C and will not permit the movement of the brake lever so that the brake is on and cannot be released. When it is desired to start the automobile, the key 3 is turned in the opposite direction and the rack 4 moved to a position where the contacts 11 and 12 and 12$^a$ engage each other, the lever 17 assumes the position shown by the solid lines in Fig. 1 of the drawings, so that the brake may be released and the automobile operated.

It will be noted that while the automobile is being driven, if the circuit in the automobile should be short circuited, the key can be immediately applied and break the circuit in the automobile by moving the gear rack so that the contacts 11, 12 and 12$^a$ are disengaged from each other.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an automobile locking apparatus, an automobile brake lever, an electrical switch with a contact in electrical connection with the negative side of an automobile battery, and another contact in connection with and grounded on the automobile, key lock and gear means for opening and closing said switches, and a lever in connection with said gear means adapted to engage and lock the brake lever with the movement of said lock means.

2. In an automobile locking apparatus, an automobile brake lever, an electrical switch with a contact in electrical connection with the negative side of an automobile battery, and another contact in connection with and grounded on the automobile, key lock and gear means for opening and closing said switches, a lever in connection with said gear means adapted to engage and lock the brake lever with the movement of said lock means, said key lock and gear means consisting of a conventional lock with a key, a shaft in operative connection therewith, a gear mounted on said shaft, and a gear rack meshing with said gear carrying a portion of said switch members.

3. In an apparatus of the class described, an automobile brake lever, a longitudinally shiftable gear rack, an electrical contact positioned thereon, contact members adapted to engage therewith secured to the automobile body, a conductor electrically connected with one of said contacts and with the negative side of the automobile battery, another conductor connecting with the other contact and grounded on the automobile body, a gear revolubly mounted and meshing with said gear rack, key lock means for revolving said gear in either direction, a cable secured to one end of said gear rack and extending therefrom, a pivotally mounted lever to which one end of said cable is secured and the other end adapted to engage the brake lever below its pivotal mounting and prevent its movement when said lever is in certain position.

4. In an apparatus of the class described, an automobile brake lever, a longitudinally shiftable gear rack, an electrical contact positioned thereon, contact members adapted to engage therewith secured to the automobile body, a conductor electrically connected with one of said contacts and with the negative side of the automobile battery, another conductor connecting with the other contact and grounded on the automobile body, a gear revolubly mounted and meshing with said gear rack, key lock means for revolving said gear in either direction, a cable secured to one end of said gear rack and extending therefrom, a pivotally mounted lever to which one end of this cable is mounted and the other end adapted to engage the brake lever below its pivotal mounting, and means tending to hold said gear rack in certain position.

5. In an apparatus of the class described, an automobile brake lever, a longitudinally shiftable gear rack, an electrical contact positioned thereon, electrical contact members adapted to engage therewith secured to the automobile body, a conductor electrically connected with one of said contacts and with the negative side of the automobile battery, another conductor connecting with the other contact and grounded on the automobile body, a gear revolubly mounted and connecting with said gear rack, key lock means for revolving said gear in either direction, a cable secured to one end of said gear rack and extending therefrom, a pivotally mounted lever to which one end of said cable is mounted and the other end adapted to engage the brake lever below its pivotal mounting, means tending to hold said gear rack in certain position, and a casing enclosing said gear rack, gear and electrical contacts and supporting said lock.

In testimony whereof, I have hereunto set my hand at Los Angeles, California, this 6th day of May, 1926.

TED MILLER.